Figure 1:
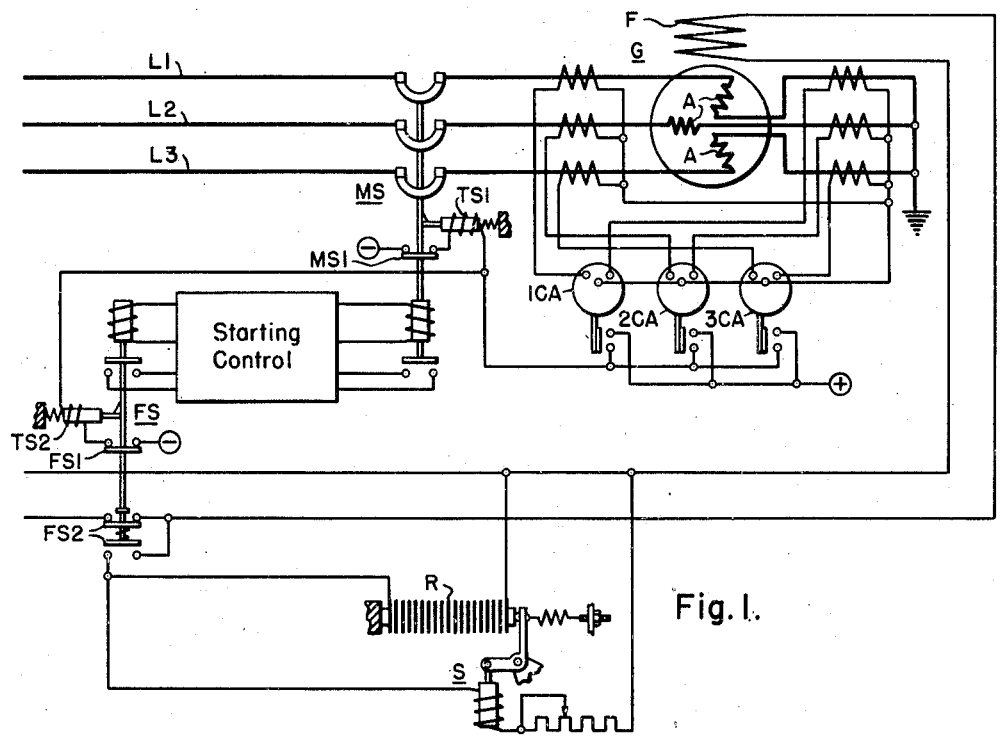

Oct. 11, 1949.    J. F. YOUNG    2,484,262
CONTROL SYSTEM
Original Filed Oct. 8, 1945

WITNESSES:
Robert C. Baird
E. F. Oberhein

INVENTOR
James F. Young.
BY
Paul E. Friedemann
ATTORNEY

Patented Oct. 11, 1949

2,484,262

UNITED STATES PATENT OFFICE 2,484,262

CONTROL SYSTEM

James F. Young, Pittsburgh, Pa., assignor to Westinghouse Electric Corporation, East Pittsburgh, Pa., a corporation of Pennsylvania Original application October 8, 1945, Serial No. 621,077. Divided and this application October 12, 1948, Serial No. 54,034

8 Claims. (Cl. 171—119)

This invention relates to generator control systems and more particularly to systems which control the rate of discharge of generator fields.

This application is a division of the copending application of Elmer G. Ratz, Serial No. 621,077, filed October 8, 1945, entitled Means to open generator field circuit and to dissipate stored magnetic field energy.

Numerous efforts have been made in the past to minimize the effect of faults on generators. Most of these, however, provide only for extremely fast disconnection of the generator from its load and the disconnection of its field circuits. This, in most cases, does not have maximum effectiveness since the self-induced E. M. F. of the generator requires some time to drop due to the relatively slow decay of the field flux. Should a generator be faulted, for example, in one of its armature windings, it is extremely important that the field flux be reduced to a negligible value, and preferably to zero, as quickly as possible to eliminate the self-generated voltage, for the reason that the self-generated voltage causes damage at the point where the generator is faulted as long as it exists. In the usual case, for example, it has been found that in large machines 8 to 20 seconds may be required for the complete discharge of a field circuit having a fixed resistance. This invention provides means whereby the field discharge time may be reduced, if desired, to one second or less.

Protective relays which operate in one cycle or less are now utilized to sense fault conditions and trip out the switches connecting the generator field to its energizing source and the armature to the load circuits; but the gain in speed of such relays is largely ineffective as far as the self-generated E. M. F. of the generator is concerned. In other words the gain of 5 or 6 cycles in fault-sensing relay operation over some of the early types is of little value in view of the slow decay of the generator field flux. In the ordinary case, the field discharge resistor is made as high in ohmic value as the field insulation will permit. Obviously the higher the discharge resistance the quicker the field flux will decay. As soon as the generator is disconnected from its load circuits and the field switch is opened to disconnect the field from its energizing source and to connect the discharge resistor across the field, the decaying field flux of the generator, due to the change in flux, generates a self-induced E. M. F. in the field and this E. M. F. discharges gradually through the discharge resistor. The higher the ohmic value of the discharge resistor the greater the self-induced voltage will be, and, therefore, the more rapid the decay of the field flux. The limit, of course, is determined by the voltage the field windings may withstand without puncturing the insulation.

This invention has for its object the provision of a control for a generator whereby the decay of the generator field flux is as rapid as possible when the generator field is connected with its discharge circuit.

More specifically stated the object of this invention is to increase the resistance of the field discharge circuit as the self-induced voltage drops.

Figures 2, 3, 4:
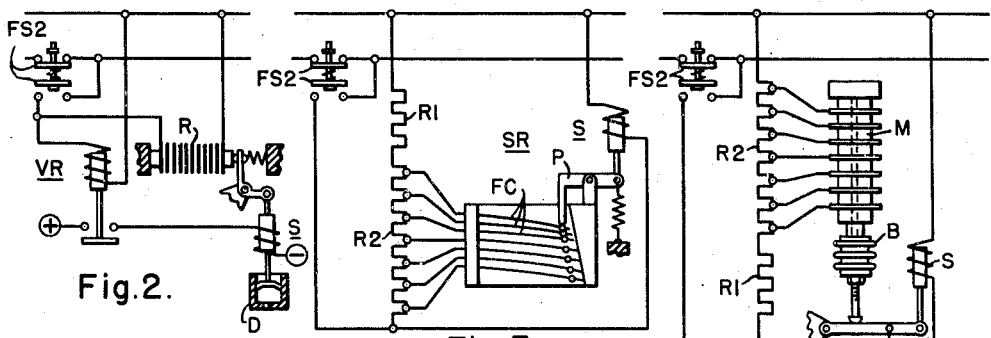
Figure 5:
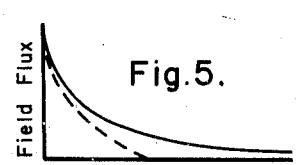
Figure 6:
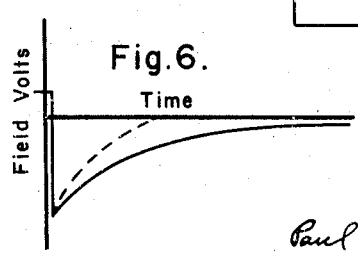

The foregoing statements are merely illustrative of the various aims and objects of this invention. Other objects and advantages will become more apparent from a study of the following specification when considered in conjunction with the accompanying drawings, in which:

Fig. 1 is a generator control circuit embodying the principles of this invention, providing an increase in generator field discharge resistance in infinitely small steps in response to the dropping discharge voltage, Fig. 2 is a modification of the invention of Fig. 1, Figs. 3 and 4 embrace the principles of Fig. 1 but utilize different resistor control elements, Fig. 5 graphically illustrates the rate of decay of the field flux obtainable with the modifications of the invention in Figs. 1 through 4 as compared with the standard fixed resistor type of discharge circuit, and Fig. 6 similarly compares the discharge voltages.

The embodiment of the invention illustrated in Figure 1 includes a generator G having armature windings A connected to the load circuits L1, L2 and L3 through the main switch MS and field windings F connected to a source of electrical energy indicated generally by the + and — signs, through the field switch FS; a group of three current-responsive automatic relays 1CA, 2CA and 3CA, each responsive to the differential of the currents in the circuits on opposite sides of one of the generator armature windings and having their contact elements each connected in energizing circuits for the coil of the tripping solenoids TS1 of the main switch MS and TS2 of the field switch FS; and a field discharge control arrangement including the carbon pile resistor R controlled by the solenoid S which is responsive to the voltage of field F.

Each of the current-responsive automatic relays 1CA, 2CA and 3CA are energized by the differential of the electrical outputs of a pair of current transformers, respectively, energized by the currents on opposite sides of each of the generator armature windings. The outputs of each pair of current transformers are in opposition in the associated automatic relay in the manner well known to the art. The automatic relays are preferably of the type which respond extremely fast to a current differential which may result, for example, from a grounding of an armature winding on the armature iron. Any one of the automatic relays upon closing its contacts completes an energizing circuit for the coils of the tripping solenoids TS1 and TS2.

The control for the field switch FS and the main switch MS is represented in block diagram. It will be understood, however, that such a control includes a conventional arrangement of push buttons and other control devices for effecting proper operation of the system. As illustrated, the main switch and field switch are in their operated positions and thus the armature winding is connected to its load circuits and the field winding connected to its energizing source.

Should a fault occur on any one of the generator armature windings, the associated current-responsive automatic relay is operated to immediately actuate the tripping solenoids TS1 and TS2 thus simultaneously tripping out the main switch and the field switch. The main switch disconnects the armature windings from the load circuits. In dropping out, the field switch FS opens its contacts FS1 in the energizing circuit for the tripping solenoid TS2 and at its make-before-break contacts FS2 it opens the energizing circuit for the field winding F and connects the discharge circuit including the carbon pile resistor R and the coil of solenoid S thereacross.

The field discharge voltage controls the solenoid S which, in turn, controls the pressure applied to the carbon pile resistance element R. Movements of the plunger of the solenoid are transmitted through a bell crank to one extremity of the carbon pile resistor R, the mechanical arrangement being such that energization of the solenoid coil increases the pressure applied to the carbon pile resistor. A tension spring affixed to the bell-crank extremity bearing against the carbon pile resistor, opposes bell-crank movements caused by the solenoid. Thus when the back contacts of the contact assembly FS2 connect the carbon pile resistor R and the solenoid coil S across the field circuit there results an action graphically explained in Figs. 5 and 6 by the dotted curves. At the first instant when the discharge voltage is high the solenoid applies maximum pressure to the carbon pile assembly. Hence, its resistance is a minimum value. As the voltage drops the solenoid pull diminishes and the tension spring functions to relieve the pressure on the carbon pile thus increasing its resistance. Thus the field flux and voltage as a consequence of the gradual insertion of discharge resistance are reduced to a minimum value in a very short time as a comparison of the dotted curves with the full line curves representative of a fixed resistance depicts.

A variant of the arrangement of Fig. 1 is had in Fig. 2 wherein the solenoid is time delayed by means of the dashpot D and is energized from a separate source through the contacts of the voltage relay VR, which relay is energized by connection of its coil across the discharge circuit at the back contacts of the assembly FS2. In this arrangement the bell crank is reversed and the solenoid now relieves the pressure on the carbon pile element R, the maximum pressure and hence minimum resistance thereof for initial field discharge now being determined by the compression spring at the carbon pile extremity of the bell crank, which spring biases the bell crank oppositely to movements thereof caused by the solenoid. The dotted curves of Figs 9 and 10 apply here also. In the first instant of field discharge the flux is high and an instant thereafter the voltage also peaks. Relay VR thus responds and energizes the coil of the solenoid S from its separate energizing source. Movement of the solenoid plunger is limited to a predetermined rate by the dashpot D to some optimum value that the maximum discharge resistance which may be had without causing excessive discharge voltage peaks is inserted in the discharge circuit.

The electrical equivalent of the invention shown in Fig. 1 appears in Fig. 3. In this arrangement a spring contact regulator SR has the flexible conductors FC thereof connected along spaced taps of the resistor R2 added in the field discharge circuit, the resistor R1 as in Figs. 1 and 2 being the fixed maximum value the field winding insulation will permit. The free extremities of the flexible conductors carry silver contact elements which are actuated to progressively contact each other by the pivoted prod P connected to the solenoid plunger. Movements of the solenoid plunger are opposed by the tension spring, which biases the prod to open the contacts of the regulator. In the first instant of field discharge the solenoid responds to the discharge voltage peak and shunts the entire resistor R2 from the discharge circuit through the medium of the closed regulator contacts. As the discharge voltage drops and the magnetic pull of the solenoid tends to relax, the tension spring overcomes the magnetic pull sufficiently to open some of the contacts and insert resistance. The progressive insertion of resistance in the field discharge circuit continues until the field is completely discharged. The curves of Figs. 5 and 6, in general principle, are illustrative of the control characteristics of this embodiment also.

Yet another equivalent of the invention in Fig. 1 appears in Fig. 4. Here a mercury controlled device M replaces the regulator SR of Fig. 3. It carries a plurality of spaced contact discs stacked between insulating segments. The discs are connected along spaced taps of the resistors R2. A hole extending through the assembly terminates in a reservoir at the top end of the device M and in a bellows at the bottom, in which bellows the mercury is normally carried. The solenoid S, again energized by the discharge voltage when the back contacts of FS2 close, compresses the bellows B and forces mercury through the entire length of the hole. As the field discharge voltage drops the magentic pull of the solenoid relaxes and the forces of the biasing spring removes the compression force against the bellows causing it to expand. As a consequence the mercury level in the hole falls and progressively disengages the contact discs from top to bottom until the field discharge is complete.

There are, of course, many other electrical equivalents of the particular arrangements illustrated in the drawings. There are, further, other variants of the circuit schemes illustrated which embrace the principles set forth in the drawings and the specification. It is, therefore, intended that the foregoing disclosure and the showing made in the drawings be considered only as illustrative of the principles of this invention and not be interpreted in a limiting sense.

I claim as my invention:

1. In a field discharge system for a dynamoelectric machine having a field winding energized from a source of electrical energy, the combination of, resistance means for forming a discharge circuit for said field winding, a first switch for connecting and disconecting said field winding and said source of electrical energy, a second switch for connecting and disconnecting said resistance means across said field winding, operating means for both of said switches for closing said second switch prior to opening of said first switch, electromagnetic means for decreasing the ohmic value of said resistance means, mechanical biasing means opposing said electromagnetic means for increasing the ohmic value of said resistance means, and circuit means connecting said electromagnetic means to be energized in dependence of the voltage of said field winding.

2. In combination, a generator having armature windings adapted for connection to a load and field winding means for exciting the generator adapted to be energized from a source of electrical energy, a carbon pile resistance element, a first switch for connecting and disconnecting said field winding means and said source of electrical energy, a second switch for connecting and disconecting said carbon means, operating means for both of said switches for closing said second switch prior to opening of said first switch, an electromagnetic device having an operating coil and a magnetically operated member, means for connecting said operating coil to be energized according to the voltage drop across said carbon pile resistance element, and means for transmitting the movements of said magnetically operated member to said carbon pile element to vary the pressure forces thereon.

3. In a field discharge system for a dynamoelectric machine having a field winding adapted to be energized from a source of electrical energy, the combination of, resistance means for forming a discharge circuit for said field winding, a first switch for connecting and disconnecting said field winding and said source of electrical energy, a second switch for connecting and disconnecting said resistance means across said field winding, operating means for both of said switches for closing said second switch prior to opening of said first switch, electromagnetic means for changing the ohmic value of said resistance means, mechanical biasing means opposing said electromagnetic means for changing the ohmic value of said resistance means in an opposite sense, circuit means connecting said electromagnetic means to be energized in dependence of the voltage of said field winding, and means for damping the movements of said electromagnetic and mechanical means.

4. In a field discharge system for a dynamoelectric machine having a field winding adapted to be connected to a source of electrical energy, the combination of, resistance means for forming a discharge circuit for said field winding, a first switch for connecting and disconnecting said field winding and said source of electrical energy, a second switch for connecting and disconnecting said resistance means across said field winding, operating means for both of said switches for closing said second switch prior to opening of said first switch, electromagnetic means for increasing the ohmic value of said resistance means, mechanical biasing means opposing said electromagnetic means for decreasing the ohmic value of said resistance means, a relay energized by the voltage across said field winding, circuit means operated by said relay when energized for applying constant excitation to said electromagnetic means, and a dashpot connected with said electromagnetic means.

5. In a field discharge system for a dynamoelectric machine having a field winding adapted to be connected to a source of electrical energy, the combination of, circuit means including a resistor for forming a discharge circuit for said field winding, a first switch for connecting and disconnecting said field winding and said source of electrical energy, a second switch for connecting and disconnecting said resistance means across said field winding, operating means for both of said switches for closing said second switch prior to opening of said first switch, a regulating device comprising a plurality of spaced flexible electrical conducting members each having contacts adjacent an extremity thereof disposed in cooperating spaced relation to the contacts of adjacent conducting members, said conducting members upon deflection engaging adjacent contacts, circuit means connecting the remaining extremities of said conducting members along spaced taps of said resistor whereupon progressive deflection of said conducting members and progressive engagement of said contacts progressively shunts said tapped portions of said resistor, an electromagnetic device connected in parallel with said resistor to be energized in dependence of the voltage thereof for deflecting said conducting members and engaging said contacts, and biasing means for opposing the operation of said electromagnet.

6. In a field discharge system for a dynamoelectric machine having field winding means energized from a source of electrical energy, the combination of, a resistance regulating device for forming a discharge circuit for said field winding, a first switch for connecting and disconnecting said field winding and said source of electrical energy, a second switch for connecting and disconnecting said resistance means across said field winding, operating means for both of said switches for closing said second switch prior to opening of said first switch, mechanical means operable in each of two directions for operating said resistance regulating device to control the resistance thereof, an electromagnetic device for actuating said mechanical means in one of said two directions, means opposing the operation of said electromagnetic device, and circuit means for energizing said electromagnetic device in dependence of the voltage of said field winding.

7. In combination, a dynamoelectric machine having armature windings and a separately excited field winding and circuit therefor, a field switch for opening and closing the field winding circuit, field discharge resistance means, a field discharge switch for connecting and disconnecting said field discharge resistance means across said field winding, operating means for actuating both of said switches, said operating means closing said field switch after opening of said field discharge switch and closing said field discharge switch prior to opening of said field switch, electromagnetically operated biasing means for changing the resistance of said field discharge resistance means, mechanical biasing means opposing said electromagnetically operated biasing means, and circuit means connecting said electromagnetically operated biasing means in parallel with said field discharge resistance means.

8. A protective circuit for a generator having armature windings and a field winding and a circuit therefor comprising, in combination, field discharge resistance means for forming a field discharge circuit for said field winding, switching means operable in one position to close the circuit for said field winding and open said field discharge circuit and operable in a second position to close said field discharge circuit prior to opening of said circuit for said field winding, electromagnetic means connected across said field discharge resistance means for changing the resistance thereof, mechanical means for opposing said electromagnetic means and changing the resistance of said field discharge resistance means in an opposite sense, and electrical means electrically connected to the armature windings of said generator for effecting movement of said switching means to said second position.

JAMES F. YOUNG.

REFERENCES CITED

The following references are of record in the file of this patent:

UNITED STATES PATENTS

| Number | Name | Date |
| --- | --- | --- |
| 2,453,341 | Rady | Nov. 9, 1948 |